(12) United States Patent
Frankel et al.

(10) Patent No.: US 10,749,670 B2
(45) Date of Patent: Aug. 18, 2020

(54) BLOCK CHAIN DECODING WITH FAIR DELAY FOR DISTRIBUTED NETWORK DEVICES

(71) Applicant: BANK OF AMERICA CORPORATION, Charlotte, NC (US)

(72) Inventors: Yair Frankel, Westfield, NJ (US); Abdul Rafman Azeez, Watchung, NJ (US); Jisoo Lee, Chesterfield, NJ (US); Joerg Schneider, Hoboken, NJ (US); Boulos M. Dib, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 409 days.

(21) Appl. No.: 15/599,176

(22) Filed: May 18, 2017

(65) Prior Publication Data

US 2018/0337695 A1    Nov. 22, 2018

(51) Int. Cl.
*H04L 9/08* (2006.01)
*H04L 9/32* (2006.01)
*H04L 29/06* (2006.01)
*H04L 29/08* (2006.01)
(Continued)

(52) U.S. Cl.
CPC ............ *H04L 9/0825* (2013.01); *H04L 9/085* (2013.01); *H04L 9/3239* (2013.01); *H04L 63/0428* (2013.01); *H04L 67/1097* (2013.01); *H04L 45/22* (2013.01); *H04L 2209/38* (2013.01); *H04W 88/06* (2013.01)

(58) Field of Classification Search
CPC ... H04L 9/0825; H04L 63/0428; H04L 9/085; H04L 9/3239; H04L 2209/38; H04L 45/22; H04L 29/08549; H04L 67/10; H04L 67/1097; H04W 88/06
See application file for complete search history.

(56) References Cited

U.S. PATENT DOCUMENTS 7,418,728 B2    8/2008  Jerdonek
7,594,275 B2 *  9/2009  Zhu ................. G06F 21/10
                                                713/180
(Continued)

OTHER PUBLICATIONS

Shamir, A., "How to Share a Secret," Communications of ACM, vol. 22 No. 11, Nov. 1979, pp. 612-613.
(Continued)

*Primary Examiner* — Patrice L Winder
(74) *Attorney, Agent, or Firm* — Michael A. Springs

(57) ABSTRACT

A system that includes a first network node configured to store a first ledger, a second network node configured to store a second ledger, and a third network node. The third network node includes a transformation engine configured to obtain a plurality of enriched shares from at least one ledger using an index identifying enriched shares linked with a data entry. The number of obtained enriched shares is at least a threshold value corresponding to the number of enriched shares needed to determine the data entry. The transformation engine configured to remove enriched data from the plurality of enriched shares to generate a plurality of shares and perform polynomial interpolation using the plurality of shares to determine the result of the polynomial interpolation at zero. The result of the polynomial interpolation at zero is equal to the data entry.

14 Claims, 5 Drawing Sheets

(51) Int. Cl.
*H04W 88/06* (2009.01)
*H04L 12/707* (2013.01)

(56) References Cited

U.S. PATENT DOCUMENTS

| | | | | |
|---|---|---|---|---|
| 7,945,784 | B1* | 5/2011 | Masinter | H04L 9/085 380/28 |
| 8,842,835 | B2* | 9/2014 | Geyzel | H04L 9/085 380/277 |
| 9,276,739 | B2 | 3/2016 | Celik et al. | |
| 9,514,326 | B1* | 12/2016 | Kroeger | G06F 16/113 |
| 9,774,578 | B1* | 9/2017 | Ateniese | H04L 9/085 |
| 10,068,228 | B1* | 9/2018 | Winklevoss | G06Q 20/3829 |
| 10,097,356 | B2* | 10/2018 | Zinder | H04L 9/3247 |
| 10,103,885 | B2* | 10/2018 | Davis | H04L 9/3066 |
| 10,423,961 | B1* | 9/2019 | El Defrawy | G06Q 20/0855 |
| 10,437,525 | B2* | 10/2019 | Huang | G06F 3/0643 |
| 2015/0278820 | A1 | 10/2015 | Meadows | |
| 2015/0332256 | A1* | 11/2015 | Minor | G06Q 20/3678 705/69 |
| 2015/0356523 | A1* | 12/2015 | Madden | H04L 9/3247 705/76 |
| 2016/0140653 | A1* | 5/2016 | McKenzie | G06Q 40/02 705/69 |
| 2016/0162897 | A1* | 6/2016 | Feeney | G06Q 20/4014 705/71 |
| 2016/0267474 | A1* | 9/2016 | Lingham | G06Q 20/363 |
| 2016/0306982 | A1 | 10/2016 | Seger, II et al. | |
| 2016/0321629 | A1* | 11/2016 | McCoy | G06Q 50/184 |
| 2016/0321654 | A1 | 11/2016 | Lesavich et al. | |
| 2016/0321752 | A1 | 11/2016 | Tabacco et al. | |
| 2016/0323105 | A1 | 11/2016 | Lee et al. | |
| 2016/0330244 | A1* | 11/2016 | Denton | G06F 21/6245 |
| 2016/0350749 | A1 | 12/2016 | Wilkins et al. | |
| 2016/0358165 | A1 | 12/2016 | Maxwell | |
| 2017/0011460 | A1 | 1/2017 | Molinari et al. | |
| 2017/0149796 | A1* | 5/2017 | Gvili | H04L 9/085 |
| 2017/0317997 | A1* | 11/2017 | Smith | H04L 9/0861 |
| 2018/0115415 | A1* | 4/2018 | Teranishi | H04L 9/0819 |
| 2018/0139045 | A1* | 5/2018 | Furukawa | H04L 63/06 |
| 2018/0241565 | A1* | 8/2018 | Paolini-Subramanya | H04L 9/3239 |
| 2018/0322259 | A1* | 11/2018 | Solow | G06F 21/105 |
| 2019/0036702 | A1* | 1/2019 | Kano | H04L 9/32 |

OTHER PUBLICATIONS

Desmedt, Y. et al., "Threshold Cryptosystems," CRYPTO '89 Proceedings of the 9th Annual International Cryptology Conference on Advances in Cryptology, Aug. 20-24, 1989, pp. 307-315.

* cited by examiner

BLOCK CHAIN DECODING WITH FAIR DELAY FOR DISTRIBUTED NETWORK DEVICES

TECHNICAL FIELD

The present disclosure relates generally to cryptography, and more specifically to a communication system using cryptography.

BACKGROUND

Networks typically interconnect a large number of network devices. These devices may be distributed anywhere geographically and the mediums used to interconnect these devices varies by length and type for each interconnection. The difference in medium lengths and types between network nodes introduces different propagation delays when data is sent from one network node to another. This means that when a network node sends data to multiple other network nodes, the data will arrive at different times at each network node. As a result, conventional systems are unable to simultaneously share information with multiple network nodes since there is no way to guarantee that the sent data will arrive at the same time for each network node. The network nodes that receive the data earlier than other network nodes have an advantage by having early access to information.

For this reason, conventional systems typically rely on a trusted third party entity to distribute data among multiple network nodes. These third-party entities serve as a centralized source for data and require a high-level of security and trust to ensure they are not compromised. These third party entities also suffer from having different propagation delays when sending data to multiple network nodes, which still results in some network nodes having an advantage by having early access to information. It is desirable to provide a solution that allows multiple network nodes to have access to data at the same time.

SUMMARY

Conventional systems typically rely on a trusted third party entity to distribute data among multiple network nodes. These third-party entities serve as a centralized source for data. Using a single centralized source for data distribution poses several technical challenges. For example, a centralized data sources requires a high-level of security and trust to ensure they are not compromised. Once a bad actor infiltrates the centralized data source the data security of the whole network is compromised. In addition, these third party entities also suffer from having different propagation delays when sending data to multiple network nodes. This means that when a network nodes sends data to multiple other network nodes, the data will arrive at different times at each network node and some network nodes will have an advantage by having early access to information.

The system described in the present application provides an unconventional technical solution that provides enhanced data security and allows data to be distributed among multiple network nodes in a way that allows multiple network nodes to have access to the shared data at the same time. The system provides a technical solution that combines encoding data segments and distributing the encoded data segments throughout a network to be published at a specified time in a distributed ledger (e.g. a blockchain). For example, when a network node wants to share data with other network nodes, it encodes and partitions the data into multiple segments called shares that are each sent to different network nodes within the network. The shares are generated such that multiple shares are necessary to determine the original data. This process provides enhanced data security because a network node that receives a share will only have access to that particular share, which is insufficient for allowing the network node to access or determine the original data. The shares provide instructions for when they should be published in the distributed ledger and made available to the other network nodes in the network. Publishing the share in the distributed ledger ensures fairness and allows multiple network nodes to have access to data at the same time. Additionally, the distributed ledger has built-in functionalities that ensures the integrity of the data published within a ledger. These features further enhance the level of data security and integrity for the network. This combination of processes provides a technical solution that overcomes the challenges in conventional systems that are cause by having different propagation delays when trying to communicate data within a network.

In one embodiment, a network node is configured to partition and encode data into multiple segments called shares. The shares are generated such that multiple shares are necessary to determine the original data. Each share is then sent to a different network node within the network. Each share also comprises instructions indicating when a receiving network node is allowed to publish their share in the distributed ledger. Once data shares have been published in the distributed ledger, a network node can obtain multiple shares and perform a decoding algorithm (e.g. polynomial interpolation) on the obtained shares to obtain the original data.

In one embodiment, this disclosure includes a system that includes a first network node and a second network node. The first network node stores a first ledger having a first data block and a second data block that comprises information derived from the first data block. The second network node stores a second ledger having a third data block and a fourth data block that are identical to the first data block and the second data block, respectively. The system further includes a third network node comprising a transformation engine. The transformation engine is configured to receive a data entry and to generate a plurality of shares derived using the data entry. In one embodiment, generating the shares includes setting a share quantity indicating the number of shares to generate and setting a threshold value indicating the number of shares from the share quantity needed to determine the data entry. The process further includes assigning a first reference number to the first ledger and assigning a second reference number to the second ledger. The process further includes generating a first share for the first ledger by inputting the first reference number assigned to first ledger into a polynomial function. The degree of the polynomial function is equal to the threshold value minus one. The result of the polynomial function at zero is the data entry. The process further includes generating a second share for the second ledger by inputting the second reference number assigned to the second ledger into the polynomial function.

The transformation engine is further configured to aggregate the first share with enriched data to generate a first enriched share. The enriched data includes information indicating a first time to publish the first enriched share in the first ledger of the first network node and an index referencing the data entry. The transformation engine is further configured to aggregate the second share with the enriched data to generate a second enriched share. The enriched data includes information indicating a second time to publish the second enriched share in the second ledger of the second network node and the index referencing the data entry. The first time and the second time are the same. The transformation engine is further configured to transmit the first enriched share to the first network node and transmit the second enriched share to the second network node.

In another embodiment, this disclosure includes a system that includes a first network node and a second network node. The first network node stores a first ledger having a first data block and a second data block that comprises information derived from the first block. The second network node stores a second ledger having a third data block and a fourth data block that are identical to the third data block and the fourth data block, respectively. The system further includes a third network node comprising a transformation engine. The transformation engine is configured to obtain enriched shares from at least one ledger using an index identifying enriched shares linked with a data entry. The number of obtained enriched shares is at least a threshold value corresponding to the number of enriched shares needed to determine the data entry. The transformation engine is further configured to remove enriched data from the enriched shares to generate a plurality of shares. The enriched data comprises the index referencing the data entry. The transformation engine is configured to perform polynomial interpolation using the shares to determine the result of the polynomial interpolation at zero, which correspond with the original data entry.

Disclosed herein are various embodiments of a system that provides several technical advantages. For example, the system provides a solution that enhances data security and allows data to be distributed among multiple network nodes in a way that allows multiple network nodes to have access to the shared data at the same time. This technical advantage overcomes the problem of having different path lengths and propagation delays between interconnected network nodes. Another technical advantage is enhanced data security because a network node that receives a share will only have access to that particular share, which is insufficient for allowing the network node to access or determine the original data. Additionally, the system leverages a distributed ledger's functionality to ensure the integrity of data that is published within the ledger. These features further enhance the level of data security and integrity for the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
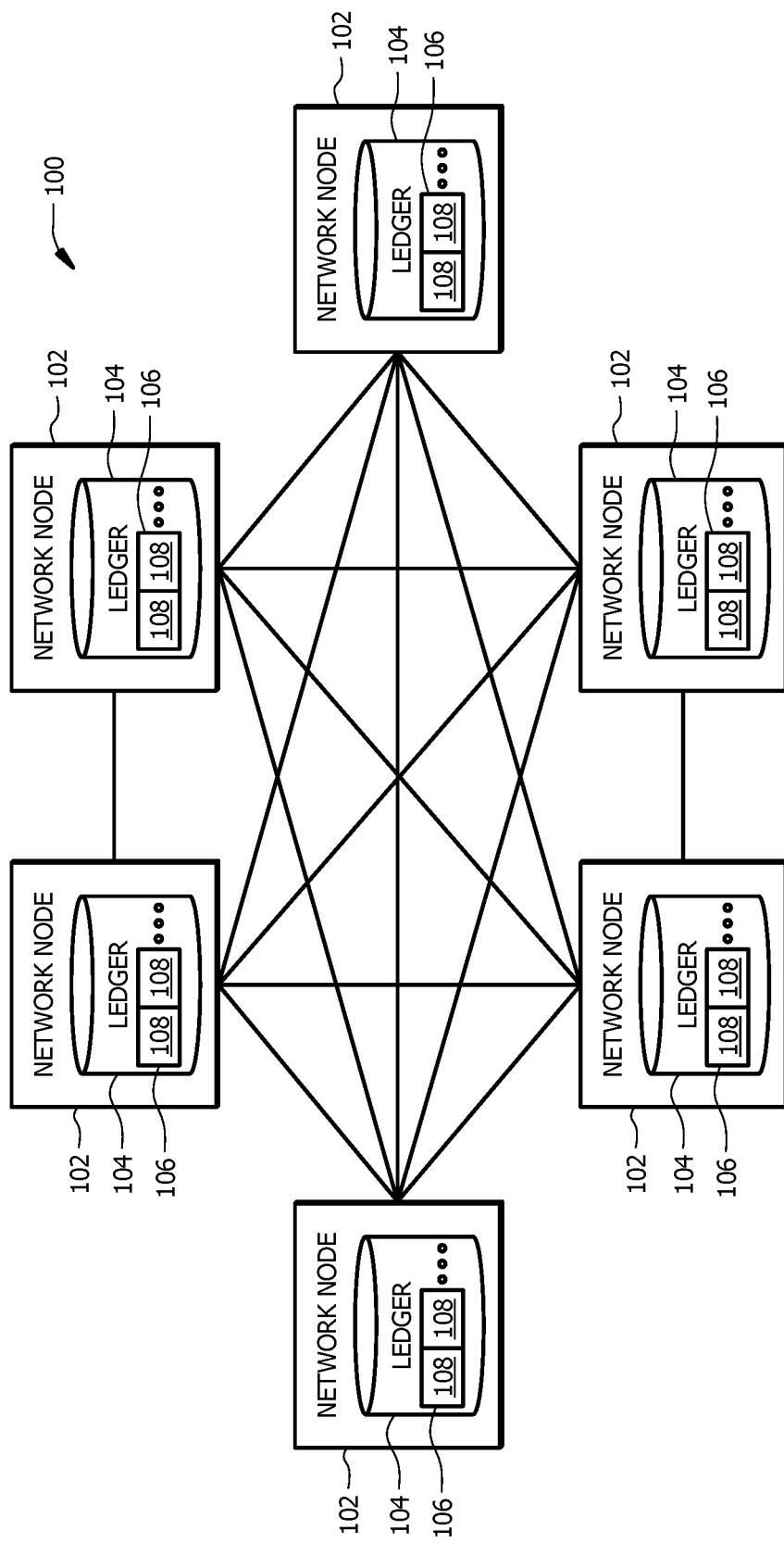
FIG. 1 is a schematic diagram of an embodiment of a network.

Networks typically interconnect a large number of network devices that may communicate data with each other. In some instances, a user may share confidential or time sensitive information with several other user. The information should be sent such that all of users have access to the information at about the same time. Any user that has access to information before other users may have an unfair advantage. For example, a user can take action based on received information before any other users if they have access to the information before the other users. The user uses their network device to share the data with the other users via the network.

These devices may be distributed anywhere geographically and the mediums used to interconnect these devices varies by length and type for each interconnection. The difference in medium lengths and types between network nodes introduces different propagation delays when data is sent from one network node to another. This means that when a network node sends data to multiple other network nodes, the data will arrive at different times at each network node. As a result, conventional systems are unable to simultaneously share information with multiple network nodes since there is no way to guarantee that the sent data will arrive at the same time for each network node. The network nodes that receive the data earlier than other network nodes have an advantage by having early access to information.

For this reason, conventional systems typically rely on a trusted third party entity to distribute data among multiple network nodes. These third-party entities serve as a centralized source for data and require a high-level of security and trust to ensure they are not compromised. These third party entities also suffer from having different propagation delays when sending data to multiple network nodes, which still results in some network nodes having an advantage by having early access to information.

Disclosed herein are various embodiments of a network that allows data to be distributed among multiple network nodes in a way that allows the multiple network nodes to have access to the shared data at the same time. The network uses a distributed ledger. Each network node in the network has a copy of the ledger. Because each network node has a copy of the same ledger, any discrepancies or errors can be mitigated by forming a data consensus with other copies of the ledger because the data within all of the ledgers should be identical.

When a network node shares data with other network nodes, it employs a secret sharing scheme that encodes and partitions the data into multiple segments called shares. Each share is then sent to a different network node within the network. The shares are generated such that multiple shares are necessary to determine the original data. A network node that receives a share will only have access to that particular share, which is insufficient for allowing the network node to access or determine the original data.

When a network node receives a share, it uses instructions provided by the share for when to publish the share into its ledger. The instructions provided by the share ensure that all of the network nodes publish their shares at the same time.

By publishing all of the shares at the same time, the network nodes within the network have access to the shares and the data at the same time. In order to determine or recreate the original data, a network node obtains multiple shares and performs a decoding algorithm (e.g. polynomial interpolation) on the obtained shares to obtain the original data.

In one embodiment, the system provides a solution that enhances data security and allows data to be distributed among multiple network nodes in a way that allows multiple network nodes to have access to the shared data at the same time. This technical advantage overcomes the problem of having different path lengths and propagation delays between interconnected network nodes. Another technical advantage is enhanced data security because a network node that receives a share will only have access to that particular share, which is insufficient for allowing the network node to access or determine the original data. Additionally, the system leverages a distributed ledger's functionality to ensure the integrity of data that is published within the ledger. These features further enhance the level of data security and integrity for the network.

FIG. 1 is a schematic diagram of an embodiment of a network 100 comprising a plurality of network nodes 102. The network 100 is any suitable type of wireless and/or wired network including, but not limited to, all or a portion of the Internet, a peer-to-peer network, a public network, a private network, the public switched telephone network, a cellular network, and a satellite network. The network 100 is configured to support any suitable communication protocols as would be appreciated by one of ordinary skill in the art upon viewing this disclosure.

The network nodes 102 are configured to communication data with one or more other network nodes 102. Examples of network nodes 102 include, but are not limited to, web clients, web servers, user devices, mobile phones, computers, tablet computers, and laptop computers. Additional information about the network nodes 102 is described in FIG. 2.

The network nodes 102 are configured to store and publish data that can be validated and/or examined by any other network nodes 102 in the network 100. In one embodiment, the network nodes 102 are configured to employ distributed ledgers 104 to implement a block chain 106.

A block chain 106 generally refers to a database shared by the network nodes 102 in the network 100. Each network node 102 comprises a ledger 104 configured to store a full copy of the block chain 106, which contains every block chain transaction executed in the network 100. The block chain 106 links together blocks 108 of data which are organized into identifiable units called transactions. Each block 108 in the block chain 106 comprises information derived from a preceding block 108. For example, every block 108 in the block chain 106 includes a hash of the previous block 108. By including the hash, the block chain 106 comprises a chain of blocks 108 from a genesis block 108 to the current block 108. Each block 108 is guaranteed to come after the previous block 108 chronologically because the previous block's hash would otherwise not be known. In one embodiment, blocks 108 in a block chain 106 may be linked together by identifying a preceding block with a cryptographic checksum (e.g. secure hash algorithm (SHA)-256) of its contents (e.g. the transaction and additional metadata) which serves as each block's unique identifier. Links are formed by storing the cryptographic checksum identifier of one block 108 in the metadata of another block 108, such that the former block 108 becomes the predecessor of the latter block 108. In this way, the blocks 108 form a chain that can be navigated from block-to-block by retrieving the cryptographic checksum of a particular's block's predecessor from the particular block's own metadata. Each block 108 is computationally impractical to modify once it has been in the block chain 106 because every block 108 after it would also have to be regenerated. When a network node 102 publishes an entry (e.g. a block 108) in its ledger 104, the block chain 106 for all of the other network nodes 102 in the distributed network 100 is also updated with the new entry. Thus, data published in a block chain 106 is available and accessible to every network node 102 with a ledger 104.

Figure 2:
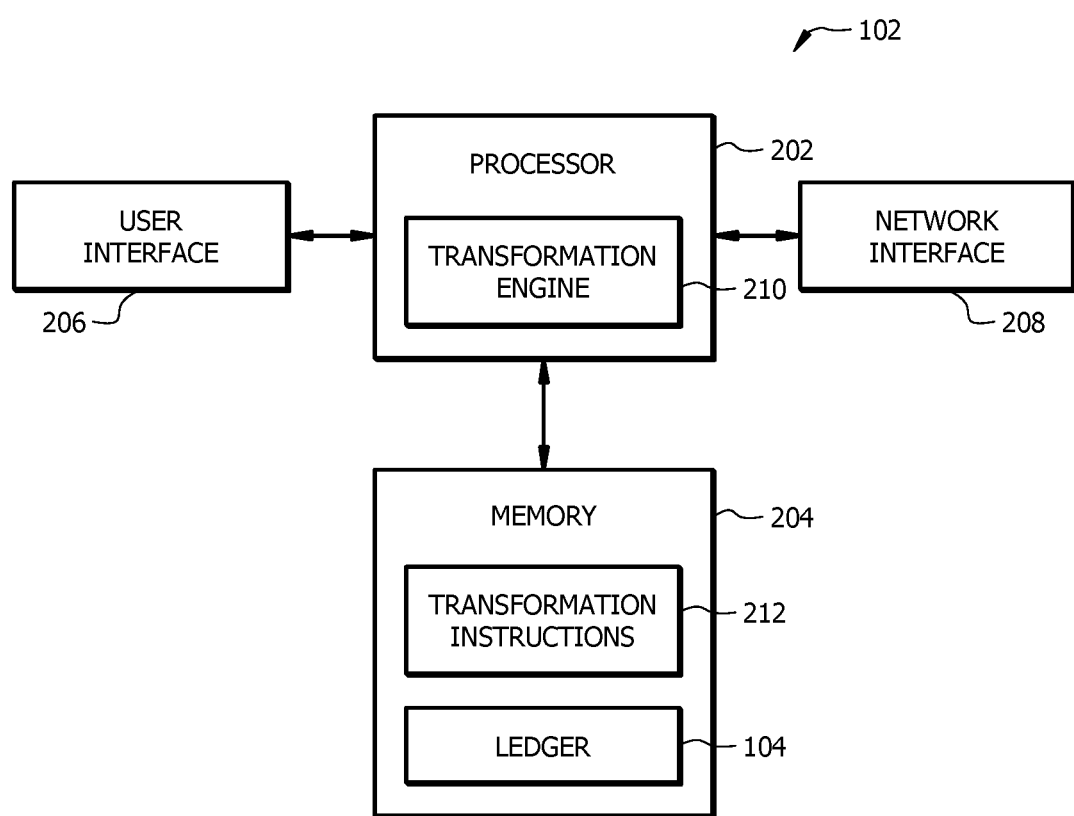
FIG. 2 is a schematic diagram of an embodiment of a network device in the network.

FIG. 2 is a schematic diagram of an embodiment of a network device 102 in the network 100. The network node 102 comprises a processor 202, a memory 204, a user interface 206, and a network interface 208. The network device 102 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a transformation engine 210. In an embodiment, the transformation engine 210 is implemented using logic units, FPGAs, ASICs, DSPs, or any other suitable hardware. The transformation engine 210 is generally configured to partition and encode data as shares that are distributed among network nodes 102 in the network 100. The transformation engine 210 is also configured to decode a plurality of shares to reconstruct data that is shared with the network 100. Examples of the transformation engine 210 in operation are described in FIGS. 3-6.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store transformation instructions 212, the ledger 104, and/or any other data or instructions. The transformation instructions 212 comprise any suitable set of instructions, logic, rules, or code operable to execute the transformation engine 210. The ledger 104 is configured to store a block chain 106 similar to the block chain 106 described in FIG. 1.

The network interface 208 is configured to enable wired and/or wireless communications. The network interface 208 is configured to communicate data through the network 100 and/or any other system or domain. For example, the network interface 208 may be configured for communication with a modem, a switch, a router, a bridge, a server, or a client. The processor 202 is configured to send and receive data using the network interface 208 from the network 100.

The user interface 206 is configured to receive inputs from a user and/or to present visual information for the user. In one embodiment, the user interface 206 is configured to receive an input from a user to initiate instructions for encoding data to be shared within the network 100 and/or instructions for decoding a plurality of shares to reconstruct data from the network 100. The user interface 206 may be configured to receive inputs from a user using a mouse, a keyboard, a touchpad, a touch screen, buttons, sliders, and/or any other suitable type of user input device. In one embodiment, the user interface 206 comprises a display unit for presenting information to a user. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. For example, the display unit may be the display of a tablet or smart phone.

Figure 3:
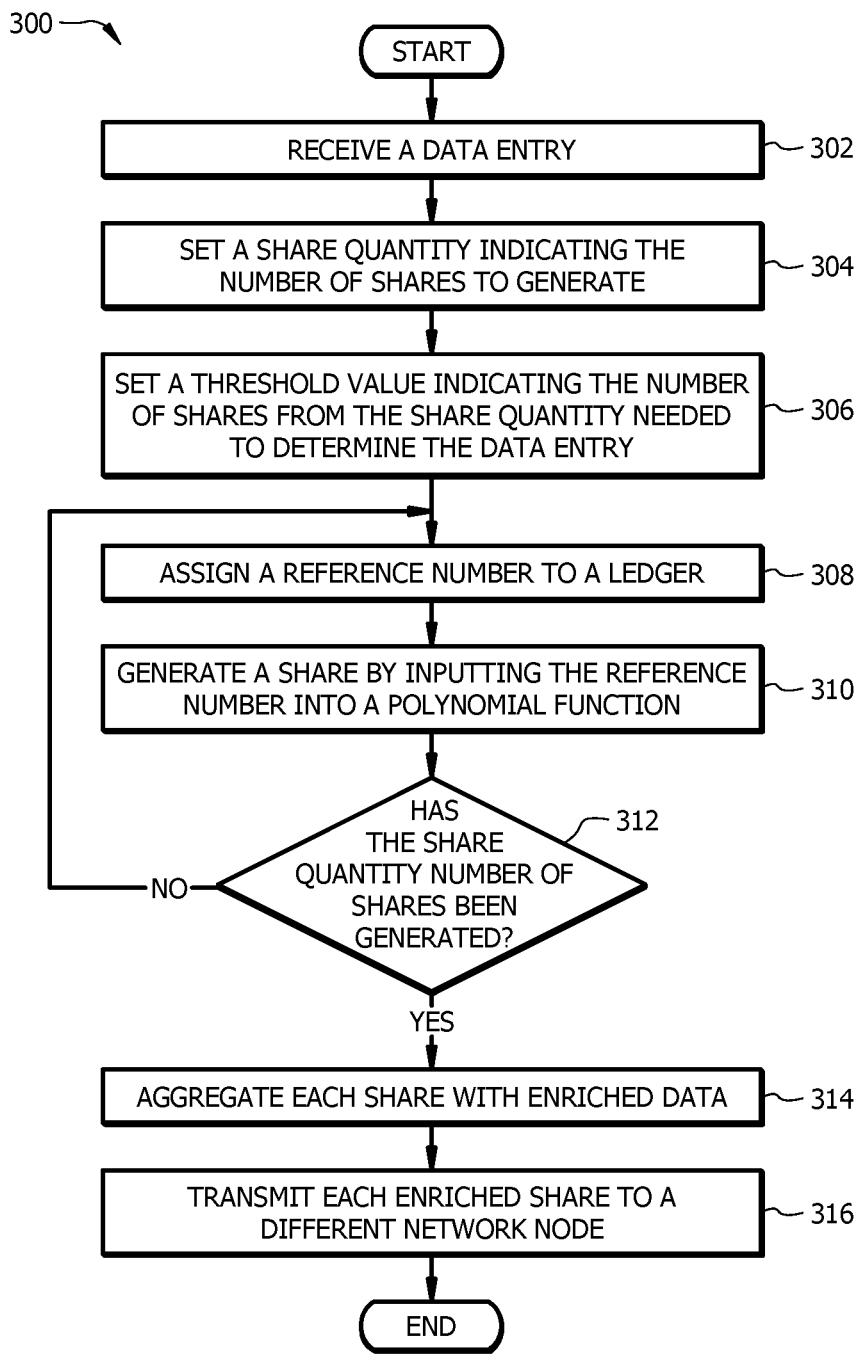
FIG. 3 is a flowchart of an embodiment of an encoding method.

FIG. 3 is a flowchart of an embodiment of an encoding method 300. Method 300 may be performed by the transformation engine 210 of a network node 102 when the network node 102 shares data that should be accessible to multiple network nodes 102 within the network 100 at the same time. The sending network node 102 employs method 300 to send different secret shares of data to different network nodes 102 rather than sending the same data to all of the network nodes 102. Each share comprises instructions indicating when the network node 102 is allowed to publish the secret in their ledger 104. This process ensure that network nodes 102 are unable to determine the original message until a sufficient number of shares have been published and made available to everyone, which occurs at a predetermined time. This process allows the network nodes 102 in the network 100 to have access to the published shares in order to determine the original data at about the same time, which overcomes the previously described problems associated with distributing information among multiple network nodes 102 at the same time.

At step 302, the transformation engine 210 receives a data entry. The data entry may be any type of data or information that is to be shared with the network 100. Examples of data include but are not limited to, data files, audio files, image files, video files, legal documents, contracts, public disclosures, private information, auction information, trade information, financial information, account information, and/or any other suitable type of information. In one embodiment the data entry may be encrypted by the transformation engine 210, for example, using a public encryption key. The transformation engine 210 may employ any suitable encryption technique as would be appreciated by one of ordinary skill in the art.

At step 304, the transformation engine 210 sets a share quantity. The share quantity indicates the number of shares to generate. For example, the share quantity may be set to the number of network nodes 102 in the network 100 to create a unique share for each network node 102. As another example, the share quantity may be set to any other value (e.g. 100) of shares to generate the plurality of shares.

At step 306, the transformation engine 210 sets a threshold value. The threshold value indicates the number of shares from the share quantity that are needed to determine or recover the data entry. For example, the threshold value may be set to five, which means that the at least five shares should be obtained in order to determine and reconstruct the original data entry. In one embodiment, the threshold value is set to a value greater than one and less than the share quantity. In other examples, the threshold value may be set to any other suitable value.

Once the threshold value is set, the transformation engine 210 obtains a polynomial function that is used to generate the shares. The degree of the polynomial function is equal to the threshold value minus one. For example, if the threshold value is set to seven, then the degree of the polynomial is six. In one embodiment, the polynomial function, f(x), is expressed as follows:

$$f(x) = a_{t-1}x^{t-1} + \ldots + a_1 x^1 + a_0$$

where, t is the threshold value, $a_{t-1}$ to $a_1$ are random values, and $a_0$ is equal to the data entry. In one embodiment, the polynomial function is randomly generated. In another embodiment, the polynomial function is selected from a plurality of polynomial functions stored in memory (e.g. memory 204).

At step 308, the transformation engine 210 assigns a reference number to a ledger 104. For example, each ledger 104 in the network 100 may be assigned a unique reference number. The reference number may be randomly selected, generated based on one or more identifiers of the network node 102 (e.g. a network address), or generated using any other suitable technique.

At step 310, the transformation engine 210 generates a share by inputting the reference number into the polynomial function. The reference number may be used as the independent variable value in the polynomial function. For example, 'x' may be set to the reference number and the polynomial function is solved for f(x). The resulting value or solution of the polynomial function with the reference number is a unique share of the data that is linked with the reference number and the corresponding ledger 104 and network node 102.

At step 312, the transformation engine 210 determines whether the share quantity number of shares have been generated. The transformation engine 210 returns to step 308 when the share quantity number of share have not been generated yet. In other words, steps 308 and 310 may be repeated until the share quantity number of shares have been generated. Otherwise, the transformation engine 210 proceeds to step 314.

At step 314, the transformation engine 210 aggregates each share with enriched data to generate enriched shares. For example, each share may be concatenated or appended with the enriched data. The enriched data comprises an index referencing the data entry. The index may used by other network nodes 102 in order to identify shares or enriched shares related to the data entry. In one embodiment, the enriched data comprises information indicating a time for a receiving network node 102 to publish the enriched share in their ledger 104. In other words, the information indicates when a receiving network node 102 should make their enriched share visible to other network nodes 102 in the network 100. In one embodiment, the enriched data comprises information indicating a wait time before a receiving network node 102 publishes the enriched share in their ledger 104. In one embodiment, the enriched data comprises information indicating a time for a receiving network node 102 to make the published enriched share no longer visible to other network nodes 102. The enriched data may further comprises any other information. In one embodiment, the enriched data is the same for all of the generated shares.

At step 316, the transformation engine 210 transmits each enriched share to a different network node 102 within the network 100. Each enriched share is sent to the network node 102 corresponding with the ledger 104 that was referenced in steps 308 and 310 to generate the share.

In one embodiment, the data entry is an encryption key. For example, the transformation engine 210 may encrypt a message using the encryption key. The transformation engine 210 may send the encrypted message using any suitable technique and may send the encryption key as the data entry using method 300. In this example, a receiving network node 102 first receives the encrypted message, but is unable to decrypt the message until the encryption key is determined by obtaining and processing multiple shares.

In one embodiment, the transformation engine 210 employs a threshold cryptographic scheme to encrypt a data entry using a public encryption key and to send the encrypted data to a plurality of ledgers 104 and network nodes 102 in the network 100. The receiving network nodes 102 are able to use their shares to partially decrypt the data. In this example, once a threshold number of partial decryptions are published, the partial decryptions can be combined to obtain the original data entry.

Figure 4:
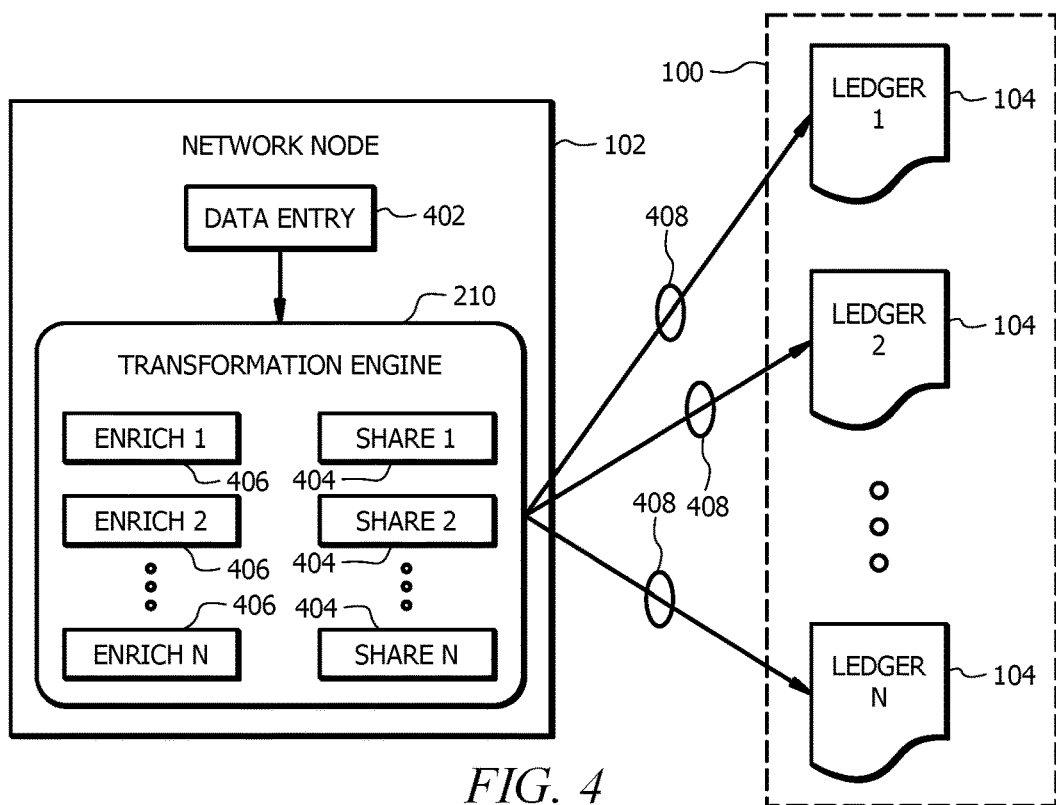
FIG. 4 is a schematic diagram of an embodiment of a network node implementing the encoding method.

FIG. 4 is a schematic diagram of an embodiment of a network node 102 implementing the encoding method 300. An example algorithm for the transformation engine 210 is as follows: receive a data entry 402; set a share quantity indicating the number of shares 404 to generate; set a threshold value indicating the number of shares 404 from the share quantity needed to determine the data entry 402; assign a first reference number to a first ledger 104; assign a second reference number to a second ledger 104; generate a first share 404 for the first ledger 104 by inputting the first reference number assigned to the first ledger 104 into a polynomial function; generate a second share 404 for the second ledger 104 by inputting the second reference number assigned to the second ledger 104 into the polynomial function; aggregate the first share 404 with enriched data 406; aggregate the second share 404 with the enriched data 406; transmit the first enriched share 408 to the first ledger 104; and transmit the second enriched share 408 to the second ledger 104.

When a receiving network node 102 receives an enriched share from a submitting network node 102, the receiving network node 102 processes the enriched share to identify information (e.g. enriched data) indicating when the receiving network node 102 is able to make the enriched share visible to other network nodes 102 in the network 100. For example, the receiving network node 102 processes the enriched share to determine when it is allowed to publish the enriched share in its ledger 104. When the receiving network node 102 publishes the enriched share in its ledger 104, the enriched share become visible and accessible to other network nodes 102 in the distributed network 100. For example, when data is published in a ledger 104 all of the other ledgers 104 in the network 100 are updated with the newly published data. The receiving network node 102 may wait until a specified time before publishing the enriched share in its ledger 104.

In one embodiment, the receiving network node 102 may also identify information indicating when the receiving network node 102 should make the enriched share no longer visible or accessible to other network nodes 102 in the network 100. For example, the receiving network node 102 may delete the enriched share, encrypt the enriched share, change visibility or permission settings for the enriched share, password lock the enriched share, or any other suitable technique to restrict visibility or access to the enriched share.

FIGS. 3 and 4 describe several technical advantages provided by the transformation engine 210. For example, the transformation engine 210 allows a network node 102 to both encoding data segments and distribute the encoded data segments throughout the network to be published at a specified time in the distributed ledger (e.g. the blockchain). This process provides enhanced data security because a network node 102 that receives a share will only have access to that particular share, which is insufficient for allowing the network node 102 to access or determine the original data. In addition, publishing the share in the distributed ledger ensures fairness and allows multiple network nodes 102 to have access to the data at the same time.

Figure 5:
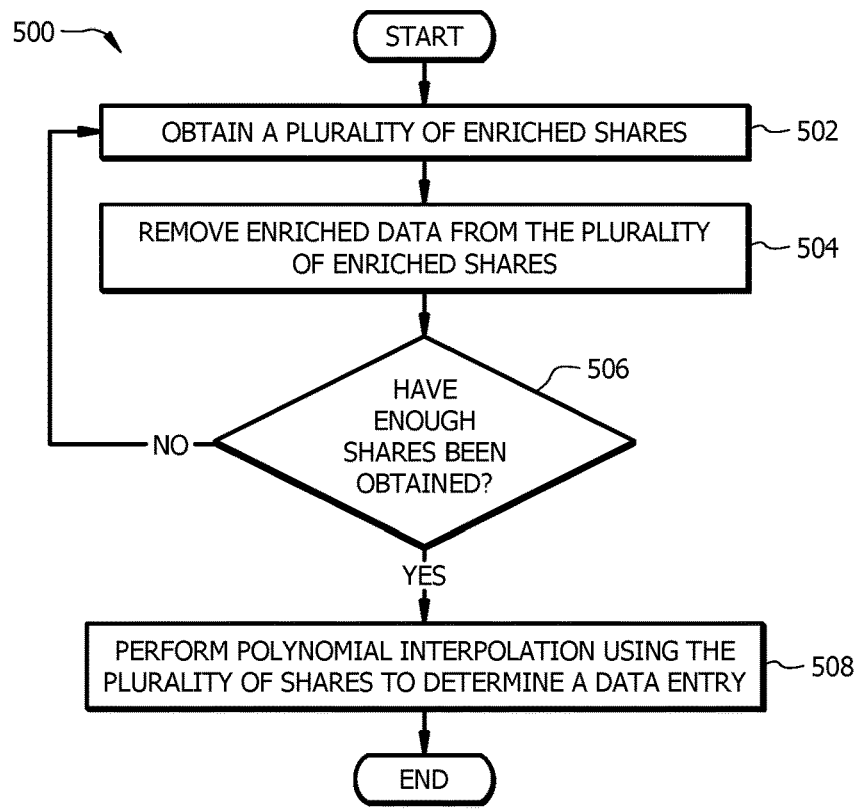
FIG. 5 is a flowchart of an embodiment of a decoding method.

FIG. 5 is a flowchart of an embodiment of a decoding method 500. Method 500 may be performed by the transformation engine 210 of a network node 102 when the network node 102 wants to read or access data that has been shared within the network 100.

At step 502, the transformation engine 210 obtains a plurality of enriched shares from one or more the ledgers 104. In one embodiment, the transformation engine 210 receives or downloads an updated copy of the ledger 104 when one or more network nodes 102 publish their enriched shares into the block chain 106. The transformation engine 210 may use an index to parse and identify enriched shares within the block chain 106 that are linked with the data of interest. For example, the transformation engine 210 uses the index as an identifier to look for enriched share in the block chain 106. In another embodiment, the transformation engine 210 receives or downloads enriched shares directly from one or more network nodes 102 and their ledgers 104.

In one embodiment, the transformation engine 210 decrypts the plurality of enriched shares when they have been previously encrypted. For example, the transformation engine 210 may decrypt the plurality of enriched shares using a public encryption key. The transformation engine 210 may employ any suitable decrypting technique as would be appreciated by one of ordinary skill in the art.

At step 504, the transformation engine 210 removes enriched data from the plurality of enriched shares to obtain the original shares that were generated by a sending network node 102.

At step 506, the transformation engine 210 determines whether enough shares have been obtained. For example, the transformation engine 210 determines whether at least a threshold value number of shares have been obtained. The transformation engine 210 returns to step 502 to obtain more enriched shares when the transformation engine 210 does not have at least the threshold value number of shares. Otherwise, the transformation engine 210 proceeds to step 508.

At step 508, the transformation engine 210 performs polynomial interpolation using the plurality of shares to determine a data entry. For example, the transformation engine 210 may generate an interpolation function (e.g. a Lagrange interpolating polynomial function) using the shares in order to determine or recover the data entry. In one embodiment, the transformation engine 210 determines the result of the interpolation function to when the input variable is zero. In this example, the result of the interpolation function at zero corresponds with the original data entry. In other examples, the transformation engine 210 may use any other suitable technique to determine or reconstruct an interpolating function for determining the original data entry as would be appreciated by one of ordinary skill in the art. In other embodiments, the transformation engine 210 determines the result of the interpolation function to when the input variable is a different value in order to determine the original data entry.

In one embodiment, the transformation engine 210 publishes the determined original data entry in its ledger 104 upon recovering the data entry. In other embodiments, the transformation engine 210 outputs the recovered data entry. For example, the transformation engine 210 outputs the recovered data entry onto a graphical user interface (e.g. user interface 206) to display for a user. As another example, the transformation engine 210 outputs the recovered data entry to one or more other devices, for example, other network nodes. As another example, the transformation engine 210 outputs the recovered data entry to a memory (e.g. memory 204).

Figure 6:
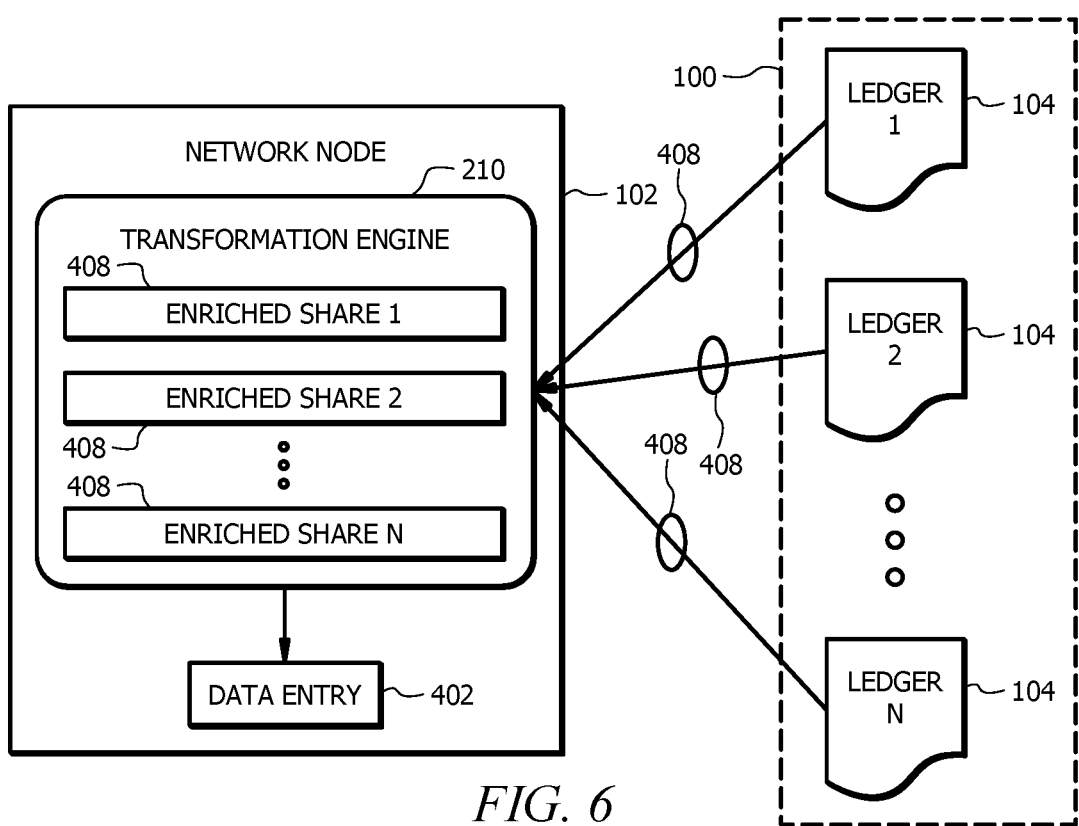
FIG. 6 is a schematic diagram of an embodiment of a network node implementing the decoding method.

In one embodiment, the recovered data entry is an encryption key. In such an example, the transformation engine 210 obtains encrypted data, for example, from a ledger of a network node 104. The transformation engine 210 decrypts the encrypted data using the encryption key. The transformation engine 210 may employ any suitable decrypting technique as would be appreciated by one of ordinary skill in the art FIG. 6 is a schematic diagram of an embodiment of a network node 102 implementing the decoding method 400. An example algorithm for the transformation engine 210 is as follows: obtain a plurality of enriched shares 408 published by other network nodes 102 in their ledgers 104, where the number of obtained enriched shares 408 is at least a threshold value corresponding to the number of enriched shares 408 needed to determine the original data entry 402; remove enriched data 406 from the enriched shares 408 to generate a plurality of shares 404; perform polynomial interpolation using the plurality of shares to determine a polynomial function used to generate the plurality of shares 404; and determine the result of the polynomial function at zero, where the result of the polynomial function at zero is equal to the data entry.

FIGS. 5 and 6 describe several technical advantages provided by the transformation engine 210. For example, the transformation engine 210 allows a network node 102 to obtain shared information by obtaining and processing a plurality of encoded data segments (e.g. enriched shares 408). This process allows the network node 102 to reconstruct the original data using multiple enriched shares, which provides access to the shared information at the same time as other network nodes 102 in the network. In other words, all of the network nodes 102 has access to the shared information at the same time and no one has an early access advantage.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a first network node wherein the first network node is configured to store a first ledger comprising a first data block and a second data block, wherein the second block comprises information derived from the first block, and wherein the first network node publishes a first plurality of enriched shares in the first ledger;
a second network node wherein the second network node is configured to store a second ledger comprising a third data block and a fourth data block, wherein:
the third data block is identical to the first data block; and
the fourth data block is identical to the second data block, and wherein the second network node publishes a second plurality of enriched shares in the second ledger; and
a third network node comprising:
a transformation engine configured to:
identify a first portion of the first plurality of enriched shares that are linked with a data entry;
identify a second portion of the second plurality of enriched shares that are linked with the data entry;
obtain a plurality of enriched shares from the first ledger and the second ledger, wherein the plurality of enriched shares include the identified first portion of enriched shares and the identified second portion of enriched shares, wherein the number of obtained enriched shares is at least a threshold value corresponding to the number of enriched shares needed to determine the data entry;
remove enriched data from the plurality of enriched shares to generate a plurality of shares, wherein the enriched data comprises an index referencing the data entry; and
perform polynomial interpolation using the plurality of shares to determine the result of the polynomial interpolation at zero, wherein the result of the polynomial interpolation at zero is equal to the data entry.

2. The system of claim 1, wherein the data entry is an encryption key, and wherein the transformation engine is configured to:
obtain encrypted data from a ledger of the plurality of network nodes, and
decrypt the encrypted data using the encryption key.

3. The system of claim 1, wherein the third network node further comprising a memory configured to store a third ledger comprising a fifth data block and a sixth data block, wherein:
the fifth data block is identical to the first data block; and
the sixth data block is identical to the second data block; and
the transformation engine is configured to publish the data entry in the third ledger upon determining the data entry.

4. The system of claim 1, wherein obtaining the plurality of enriched shares comprises decrypting the plurality of enriched shares using a public encryption key.

5. The system of claim 1, wherein the enriched data is the same for each share from the plurality of enriched shares.

6. The system of claim 1, wherein the degree of the polynomial function is equal to the threshold value minus one.

7. The system of claim 1, wherein perform polynomial interpolation comprises generating an interpolation function using the plurality of shares.

8. A method comprising:
identifying a first portion of a first plurality of enriched shares that are published by a first node to a first ledger comprising a first data block and a second data block that comprises information derived from the first data block, wherein the first portion of the first plurality of enriched shares is identified as being linked with a data entry;
identifying a second portion of a second plurality of enriched shares that are published by a second node to a second ledger comprising a third data block and a fourth data block, wherein the third data block is identical to the first data block, the fourth data block is identical to the second data block, and the second portion of the second plurality of enriched shares is identified as being linked with the data entry;
obtaining, by a transformation engine operably coupled to a network interface, a plurality of enriched shares from the first ledger and the second ledger, wherein the plurality of enriched shares includes the identified first portion of enriched shares and the identified second portion of enriched shares, wherein the number of obtained enriched shares is at least a threshold value corresponding to the number of enriched shares needed to determine the data entry;
removing, by the transformation engine, enriched data from the plurality of enriched shares to generate a plurality of shares, wherein the enriched data comprises an index referencing the data entry; and
performing, by the transformation engine, polynomial interpolation using the plurality of shares to determine a result of the polynomial interpolation at zero, wherein the result of the polynomial interpolation at zero is equal to the data entry.

9. The method of claim 8, wherein:
the network interface is in data communication with a network comprising a plurality of network nodes, and
the data entry is an encryption key;
further comprising:
obtaining, by the transformation engine, encrypted data from a ledger of the plurality of network nodes, and
decrypting, by the transformation engine, the encrypted data using the encryption key.

10. The method of claim 8, further comprising publishing, by the transformation engine, the data entry in a distributed ledger upon determining the data entry.

11. The method of claim 8, wherein obtaining the plurality of enriched data shares comprises decrypting the plurality of enriched shares using a public encryption key.

12. The method of claim 8, wherein the enriched data is the same for each share from the plurality of enriched shares.

13. The method of claim 8, wherein the degree of the polynomial function is equal to the threshold value minus one.

14. The method of claim 8, wherein performing polynomial interpolation comprises generating an interpolation function using the plurality of shares.

\* \* \* \* \*